3,335,140
2-METHYL-6-(5-NITRO-2-FURYL)-3-THIO-
as-TRIAZINE-3,5(4H)-DIONE
Homer Albert Burch, Norwich, N.Y., assignor to The Norwich Pharmacal Company, a corporation of New York
No Drawing. Filed Feb. 26, 1965, Ser. No. 435,719
1 Claim. (Cl. 260—248)

This invention relates to the compound of te formula:

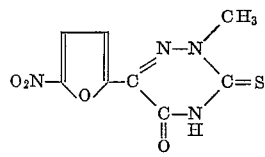

and its preparation.

This compound possesses valuable antimicrobial properties. For instance, when administered via the feed supply at a level of from 0.011–0.022% by weight to chickens infected with *Eimeria tenella*, the predominant causative organism of cecal coccidiosis, prevention of mortality and morbidity associated with that disease is effected. It is also capable upon peroral administration of combatting systemic bacterial infections in animals. Thus, when administered in a dose of about 100 mg./kg./day to mice lethally infected with *Staphylococcus aureus* or *Salmonella typhosa*, protection against mortality is achieved in 50% of the animals so treated.

The compound of this invention may be conveniently prepared by nitrating the corresponding furan compound 6-(2-furyl)-2-methyl - 3-thio-as-triazine - 3,5(4H)-dione. This new intermediate is readily prepared by bringing together 2-methylthiosemicarbazide and 2-furoylformic acid preferably under the influence of heat and in the presence of a solvent and a base such as potassium hydroxide followed by acidification of the reaction mixture and collection of the product by filtration. Nitration of it is easily effected with mixed acid to yield the desired compound.

The formulation of the compound of this invention into suitable dosage forms, such as tablets, suspensions, elixirs, capsules, lozenges and the like, is readily achieved using excipients and adjuvants common to the pharmaceutical art.

In order that this invention may be readily available to and understood by those skilled in the art, the following example is supplied:

(A) *6-(2-furyl)-2-methyl-3-thio-as-triazine-3,5(4H)-dione (F-353)*

To 105 gms. (1.0 mole) of 2-methylthiosemicarbazide is added 140 gms. (1.0 mole) of 2-furoylformic acid and 1500 ml. of water. The ecidic mixture is heated on a steam bath for 15 minutes after which it is made basic by the addition of an aqueous solution of potassium hydroxide. The mixture is heated at 60–70° for 15 minutes, coled, and acidified with concentrated hydrochloric acid. The product (A) is obtained by filtration as a tan solid melting at 235–255° in a yield of 220 gms.

Recrystallizaiton from glacial acetic acid raises the melting point to 246–247°.

*Analysis.*—Calcd. for $C_8H_7N_3O_2S$: C, 45.94; H, 3.37; S, 15.30. Found: C, 45.86; H, 3.47; S, 15.38.

(B) *2-methyl-6-(5-nitro-2-furyl)-3-thio-as-triazine-3,5(4H)-dione*

To 15 ml. of concentrated sulfuric acid at 10° is added slowly 5.0 gms. (0.024 mole) of 6-(2-furyl)-2-methyl-3-thio-as-triazine-3,5(4H)-dione. After the solution is cooled to −5° a solution of 3 ml. of concentrated sulfuric acid and 3 ml. (0.048 mole) of concentrated nitric acid is added dropwise at less than 5°. The solution is poured into 500 ml. of ice water. The product is collected by filtration and washed with water to give 6.0 gms. This is recrystallized from glacial acetic acid. The product is collected by filtration in a yield of 3.0 gms. (54%). Recrystallization from dilute acetic acid gives the title product as yellow platelets melting at 210–212°.

*Analysis.*—Calcd. for $C_8H_6N_4O_4S$: C, 37.80; H, 2.38; N, 22.05. Found: C, 37.89; H, 2.49; N, 21.76.

What is claimed is:
A compound of the formula:

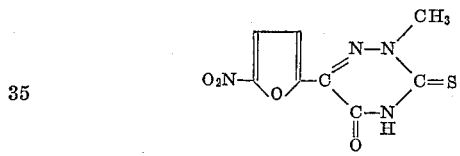

References Cited
UNITED STATES PATENTS
3,139,431   6/1964   Hayes _____ 260—248

OTHER REFERENCES
Erickson et al.: "The 1,2,3 and 1,2,4-Triazines, Tetrazines and Pentazines," Interscience Pub., Inc., New York (1956), pp. 68–78.

WALTER A. MODANCE, *Primary Examiner.*
JOHN M. FORD, *Assistant Examiner.*